Nov. 21, 1933. T. C. HENNEBERGER ET AL 1,936,194
GAS PRESSURE ALARM CONTACTOR
Filed May 11, 1932  2 Sheets-Sheet 1
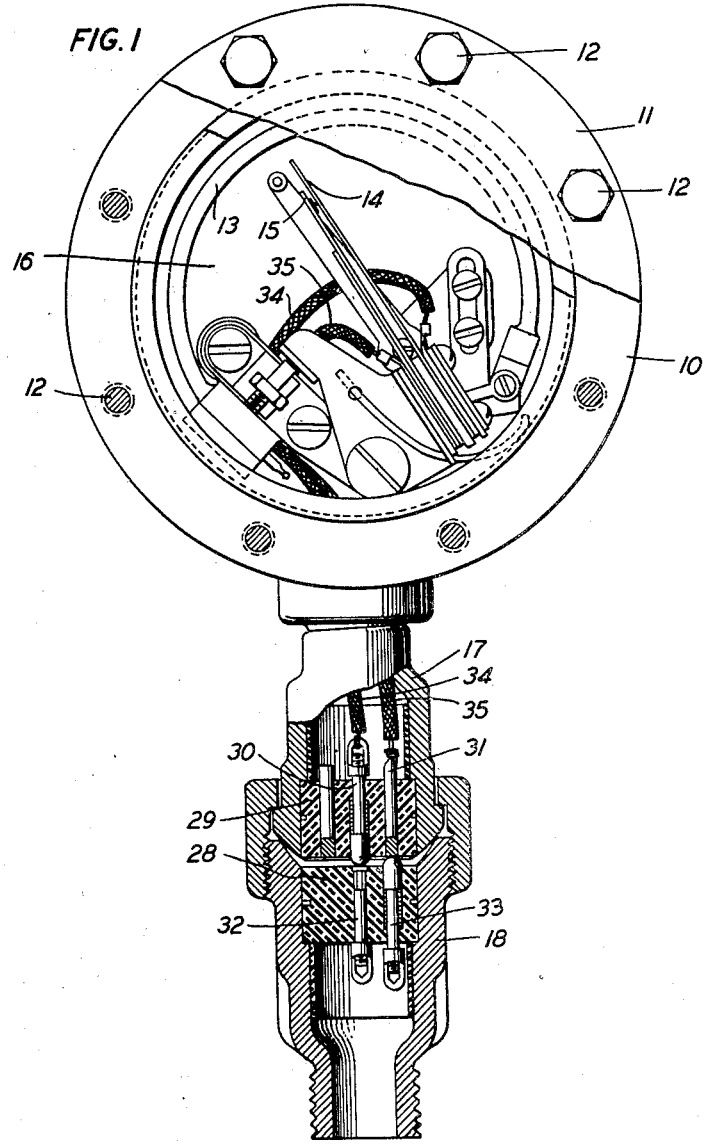
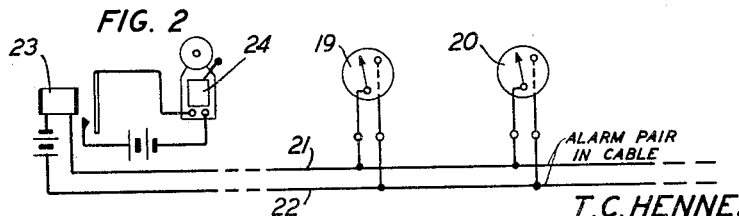
INVENTORS: T. C. HENNEBERGER
V. B. PIKE
BY J. MacDonald
ATTORNEY

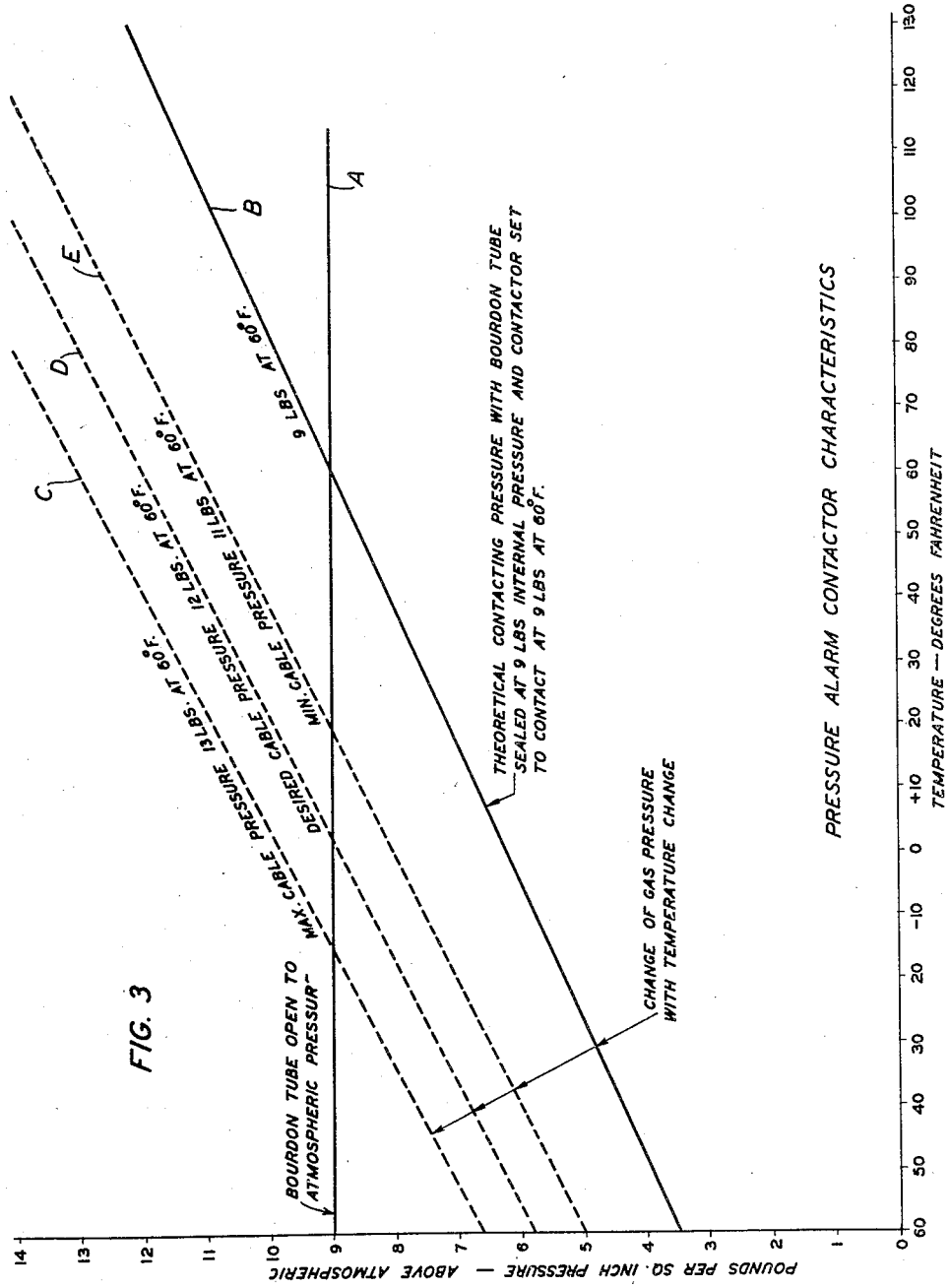

Patented Nov. 21, 1933

1,936,194

UNITED STATES PATENT OFFICE 1,936,194

GAS PRESSURE ALARM CONTACTOR

Thomas C. Henneberger, Caldwell, and Vernon B. Pike, Morristown, N. J.; said Henneberger assignor to American Telephone and Telegraph Company, a corporation of New York, and said Pike assignor to Bell Telephone Laboratories, Incorporated, New York, N. Y., a corporation of New York Application May 11, 1932. Serial No. 610,726

12 Claims. (Cl. 200—31)

This invention relates to apparatus for use in connection with the maintenance of cables and more particularly to apparatus for use with cables which are held continuously under gas pressure.

The object of the present invention is to provide an alarm contactor or pressure gauge of the well-known Bourdon type which is so constructed that the pressure at which the contactor operates to give an alarm changes more nearly in conformity with the normal change of the cable pressure with temperature.

The purpose of placing cables under continuous pressure is to prevent the entrance of moisture into the cable and to permit the locating of sheath openings before the occurrence of insulation trouble. To provide means for detecting loss of pressure in the cable, pressure contactors are installed at points some distance apart along the cable; for example, at points about three miles apart, and to connect the contactors in parallel across a pair of wires which in turn are connected to a suitable alarm, so that a warning is given automatically when the pressure falls below a predetermined value. Usually the cable is maintained at a pressure of 12.0±1.0 lbs. per square inch and the contactors are adjusted to operate at 9.0±0.5 lbs. per square inch so that the alarm is given when the cable pressure falls to 75 per cent of the value at which the cable is being maintained. These pressures are based on a standard cable temperature of 60° F.

As the temperature of the cable changes, the pressure of the gas confined within the cable changes also in accordance with well-known physical laws. For example, at a temperature of about 5° above zero Fahrenheit, the cable pressure has decreased to 9 lbs., which is the pressure at which the contactor is normally set to operate. It is necessary, therefore, that the contactor be of such design that its operating pressure is automatically corrected for normal changes in cable pressure caused by temperature changes.

Applicants' improved contactor operates on the principle of the Bourdon tube, but it differs from the ordinary arrangement in that gas above atmospheric pressure is sealed inside this tube and the variable gas pressure of the cable is admitted to the casing around the tube. With this arrangement the wires leading from the alarm pair of the cable to the contacts of the contactor can be placed in the same housing through which the pressure is admitted to the casing which surrounds the Bourdon tube. A decrease in the pressure of the gas entering the casing causes the Bourdon tube to expand and actuate a rocker arm connected to the free end of the tube by a link, thus causing the insulated pin on the rocker arm to release its pressure on one of the contact springs allowing it to make contact with the other spring thus making electrical connection between the springs, and causing an alarm to operate.

The preferred arrangement for applicants' improved contactor is to seal the Bourdon tube at a pressure equal to the nominal pressure to which the cable pressure is to fall, at the standard temperature, before alarm is given, i. e., to seal the tube at a pressure of 9 lbs. at 60° F. The curves for cable pressure and contactor operating pressure are then substantially parallel through the range of temperatures in which there is interest from a practical standpoint (about −10° F. to +120° F.) and false operation of the contactor cannot occur. Theoretically, for this condition the loss of gas, by weight, which must occur before alarm is given is the same for all temperatures.

In general the invention takes the form of a gas-tight chamber adapted for connection with a cable sleeve or the like, and a Bourdon tube sealed above atmospheric pressure on the inside of said chamber and arranged to operate a pair of contacts when the gas in the chamber falls below a certain predetermined value.

The invention will be more clearly understood from the following detailed description of one desirable embodiment thereof read with reference to the accompanying drawings:

Fig. 1 of the drawings is a plan view partly in section illustrating applicants' improved contactor;

Fig. 2 is a diagrammatic showing of the contactor shown in Fig. 1 connected to the wires in the cable; and Fig. 3 is a set of curves illustrating the comparative characteristics of a gas pressure alarm contactor with its Bourdon tube open to atmospheric pressure and the contactor shown in Fig. 1 in which the Bourdon tube is sealed above atmospheric pressure.

With reference now to Fig. 1 of the drawings, the gas pressure alarm contactor comprises a casing 10, and a gas-tight cover 11 which is secured to the casing by means of the studs 12. The mechanism on the inside of the casing 10 works on the principle of the Bourdon tube, but differs from the ordinary arrangement based on this principle, in that the inside of the Bourdon tube 13 is sealed above atmospheric pressure. This tube 13 when expanded by sufficient pressure in the device 10 holds the contact springs 14 and 15 open. When the pressure introduced into the cavity 16 in the casing 10, which is connected to the cable sheath by means of the fittings 17 and 18, decreases, the tube 13 tends to straighten and this causes the contact springs 14 and 15 to come into contact with each other, thereby closing the circuit and operating alarm as shown in Fig. 2 in which the two contactors 19 and 20 are connected in parallel across the alarm pair 21 and 22 which terminates in the alarm relay 23, which when energized causes the bell 24 to operate. As shown in Fig. 2, the alarm pair 21 and 22 are brought out for connection or looped through suitable terminals.

The contactor 10 is provided with fittings 17 and 18 through which the gas is admitted to the inside of the contactor. Located in the fittings 17 and 18 are the insulating members 28 and 29, in which contact members are mounted, the contacts 30 and 31 of the member 29 making contact with the corresponding contacts 32 and 33 of the member 28, the contacts 30 and 31 being connected to the contact springs 14 and 15 of the contactor 10, through the lead wires 34 and 35, the contacts 32 and 33 in the insulating member 28 being connected to a pair of conductors in the cable to which the contactor is connected. The members 28 and 29 are tightly secured in their respective fittings 17 and 18 and holes are provided therein to permit the gas to pass from the cable to the cavity 16 of the contactor 10.

When the pressure in the cable is normal, the tube 13 of the contactor 10 holds the springs 14 and 15 apart and the alarm circuit (as shown in Fig. 2) is open. If, however, the cable pressure falls below a predetermined value, the pressure on the inside of the Bourdon tube being greater than the pressure in the cavity 16 on the outside of the tube, will cause the contacts associated with the Bourdon tube to close and indicate that there is a leak at some point along the cable section to which the contactor is connected.

Referring now to Fig. 3, A represents the theoretical contacting pressure with the Bourdon tube open to atmospheric pressure, B represents the Bourdon tube sealed above atmospheric pressure, C, D and E represent maximum cable pressures of 11, 12 and 13 pounds at 60° F. respectively, and indicates the change of gas pressure with temperature. It will be observed that the line A is practically straight and intersects the line C at minus 15° F., line D at plus 2° F., and line E at plus 19° F., thereby indicating that the contactor will operate at these temperatures without loss of gas from the cable.

Line B which represents the theoretical contacting pressure with the Bourdon tube sealed above atmospheric pressure, practically parallels the lines C, D and E and will not intersect these lines until well beyond the conditions which are met during actual cable temperature changes, therefore there will be no false operation of the contactor mechanism over the entire range through which the contactor is designed to operate. A contactor operating along the line "B" will require the loss of exactly the same weight of gas from the cable at all natural temperatures before it will close the alarm circuit.

It is to be understood that various modifications and changes may be made in this device without departing from the spirit of the invention. For example, applicants do not intend to limit themselves to any definite pressure in the Bourdon tube.

What is claimed is:

1. A pressure contactor comprising a gas filled sealed chamber, contact members mounted in said chamber, a tube associated with and adapted to actuate said contact members, said tube having gas sealed therein at a pressure above atmospheric.

2. A pressure contactor comprising a gas filled sealed chamber, contact members mounted in said chamber, a tube associated with and adapted to actuate said contact members, said tube having gas sealed therein at a pressure above atmospheric.

3. A pressure contactor comprising a gas filled sealed chamber, contact members mounted in said chamber, a tube hingedly connected to said contact members adapted to actuate said members upon movement of said tube, said tube having gas sealed therein at a pressure above atmospheric.

4. A pressure contactor comprising a gas filled sealed chamber, contact members mounted in said chamber, a tube hingedly connected to said contact members adapted to actuate said contact members upon movement of said tube, said tube having gas sealed therein at a pressure above atmospheric.

5. A pressure contactor comprising a gas filled sealed chamber, contact members mounted in said chamber, a tube associated with and adapted to actuate said contact members, said tube having one end rigidly secured in said chamber and the other end hingedly secured to said contact members, said tube having gas sealed therein at a pressure above atmospheric.

6. A pressure contactor comprising a gas filled sealed chamber, contact members mounted in said chamber, a tube associated with and adapted to actuate said contact members, said tube having one end rigidly secured in said chamber and the other end hingedly secured to said contact members, said tube having gas sealed therein at a pressure above atmospheric.

7. A pressure contactor comprising a gas filled sealed chamber, contact members mounted in said chamber, a rocker arm associated with and adapted to engage said contact members, a tube associated with and adapted to actuate said rocker arm, said tube having a fixed end and a free end, the free end hingedly connected to said rocker arm, said tube having gas sealed therein at a pressure above atmospheric.

8. A pressure contactor comprising a gas filled sealed chamber, contact members mounted in said chamber, a rocker arm associated with and adapted to engage said contact members, a tube associated with and adapted to actuate said rocker arm, said tube having a fixed end and a free end, said free end hingedly connected to said rocker arm, said tube having gas sealed therein at a pressure above atmospheric.

9. A pressure contactor comprising a gas filled sealed chamber, contact members mounted in said chamber, a curved tube associated with and adapted to actuate said contact members, said tube having gas sealed therein at a pressure above atmospheric.

10. A pressure contactor comprising a gas filled sealed chamber, contact members mounted in said chamber, a curved tube associated with and adapted to actuate said contact members, said tube having gas sealed therein at a pressure above atmospheric.

11. A pressure contactor comprising a gas filled sealed chamber, contact members mounted in said chamber, a curved tube hingedly connected to said contact members adapted to actuate said contacts upon movement of said tube, said tube having gas sealed therein at a pressure above atmospheric.

12. A pressure contactor comprising a gas filled sealed chamber, contact members mounted in said chamber, a curved tube hingedly connected to said contact members and having a fixed end and a free end, said free end hingedly connected to said contact members and adapted to actuate said contact members upon movement of said tube, said tube having gas sealed therein at a pressure above atmospheric.

THOMAS C. HENNEBERGER.
VERNON B. PIKE.